United States Patent [19]
Kennedy et al.

[11] 3,713,968
[45] Jan. 30, 1973

[54] COMPOSITE PRESSURE SUPRESSION CONTAINMENT STRUCTURE FOR NUCLEAR POWER REACTORS

[75] Inventors: William J. L. Kennedy, Winchester, Mass.; Charles B. Miczek, Braintree, Mass.; George Barabedian, Arlington, all of Mass.

[73] Assignee: Stone & Webster Engineering Corporation, Boston, Mass.

[22] Filed: Oct. 3, 1968

[21] Appl. No.: 764,865

[52] U.S. Cl. .................176/37, 176/87, 52/224, 52/245
[51] Int. Cl. .............................G21c 13/10
[58] Field of Search .......52/224, 245; 176/37, 87, 38

[56] References Cited

UNITED STATES PATENTS

| | | | |
|---|---|---|---|
| 490,779 | 1/1893 | Zimmerman | 52/82 |
| 3,111,811 | 11/1963 | Eggink et al. | 52/224 |
| 3,158,546 | 11/1964 | Cordova | 176/37 |
| 3,230,911 | 1/1966 | Garlock, Jr. | 52/82 |
| 3,287,226 | 11/1966 | Webb | 176/37 |
| 3,260,020 | 7/1966 | Patin | 52/224 |
| 3,318,780 | 5/1967 | Bohmann et al. | 176/87 |
| 3,390,211 | 6/1968 | Ziegler | 52/224 |
| 3,423,286 | 1/1969 | Weems et al. | 176/37 |
| 3,438,857 | 4/1969 | Sulzer | 176/37 |
| 3,115,450 | 12/1963 | Schantz | 176/38 |
| 3,459,635 | 8/1969 | Bevilacqua et al. | 176/37 |

Primary Examiner—Reuben Epstein
Attorney—Morgan, Finnegan, Durham & Pine

[57] ABSTRACT

A nuclear power reactor pressure suppression containment system wherein the primary containment includes a biological shielding, vapor barrier and strength member, all of which are constructed and function as a composite structure. A conically shaped concrete pressure vessel internally lined with a gas-impervious membrane comprises the primary containment. A support structure centrally positioned within the primary containment carries the reactor vessel and internal floor independently of the primary containment vessel, the internal floor separating the drywell from the pressure suppression chamber. A secondary containment comprising a cylindrical concrete vessel houses the primary containment vessel and is also supported independently thereof on a common foundation.

8 Claims, 1 Drawing Figure

PATENTED JAN 30 1973 3,713,968
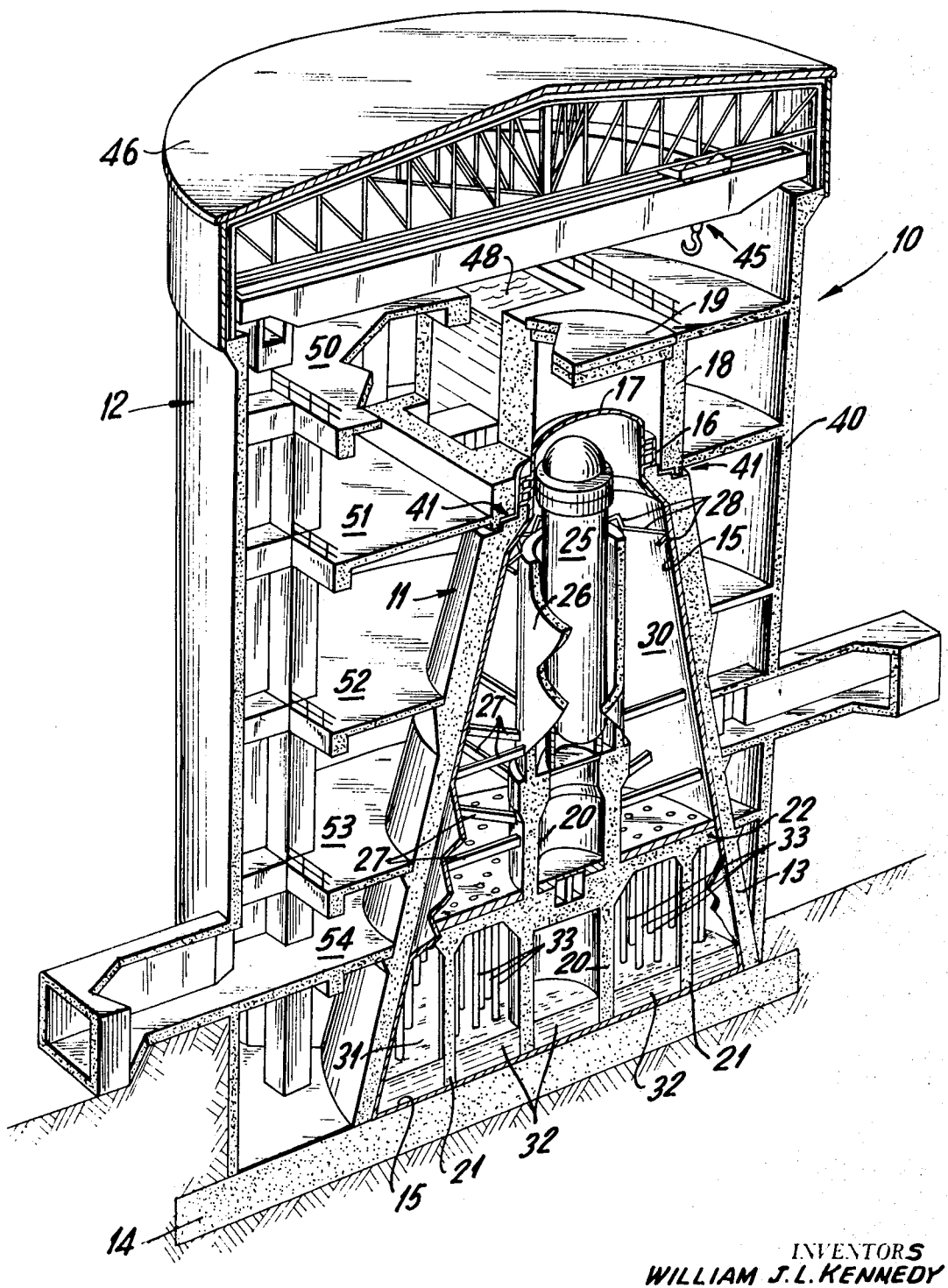
INVENTORS
WILLIAM J. L. KENNEDY
CHARLES B. MICZEK
GEORGE GARABEDIAN
BY
Morgan, Finnegan, Durham & Pine
ATTORNEYS

COMPOSITE PRESSURE SUPRESSION CONTAINMENT STRUCTURE FOR NUCLEAR POWER REACTORS

BACKGROUND AND OBJECTS OF THE INVENTION

This invention relates generally to containment systems for nuclear reactors, and relates more particularly to certain new and useful improvements in constructional features for the utilization in such containment systems of concrete structures and the pressure suppression containment concept.

Nuclear reactor systems of the pressurized water or boiling water types are generally enclosed within a vapor containment structure designed to withstand the maximum pressure buildup which might be obtained as a result of an accident involving the primary coolant barrier, causing sudden vaporization of the water. There is also the possibility of the release of hydrogen gas due to chemical reaction of the core material and the metal cladding with the high temperature water. It is essential that such gases and vapors be contained within the reactor and the pressure be reduced so as not to exceed the limits predetermined by the structural design thereof. The safety of nuclear power reactors is based on the principle that in case of an accident accompanied by the release of radioactive fission products, all contaminated gases, liquids, and solids must be contained in a leak-tight vessel until the radioactivity level has decreased to within tolerable limits.

The most common solution to the problem of containment is to build a vessel around the nuclear reactor and primary coolant system of sufficient volume to hold, under moderate pressure, the flashing coolant escaping out of a maximum credible loss of coolant accident. This concept of containment leads to very large leak-tight vessels with high material and erection costs. Different means of reducing the size and, therefore, the cost of the containment vessel have been proposed. One such proposal is the so-called pressure suppression containment concept which is generally feasible for water-cooled reactors. In the "pressure suppression" technique, in the event of a vapor or steam-producing reactor accident such as, for example, a process system piping failure, the increased pressure within the containment vessel is reduced by condensing the vapor or steam with a condensing material, such as water.

Heretofore, it has been customary in containment systems utilizing the pressure suppression technique to house the reactor vessel in a heavy wall steel pressure vessel spaced from a surrounding concrete shielding wall by an expansion space. In these prior systems, the steel vessel is bulbous-shaped and contains an inner toroidal pressure suppression chamber to which the reactor vessel is connected by suitable vent pipes. These systems are disadvantageous in that the structural materials are inefficiently used, there are difficulties in accommodating the expansion between the steel pressure vessel and the concrete shielding wall, the steel vessel is subject to catastrophic failure by propagation of membrane cracking, and it is both difficult and expensive to construct a steel vessel which will withstand vacuum conditions. These latter conditions may occur upon the containment cold water spray system being activated by a vapor or steam-producing reactor accident. In addition, it is very advantageous for a containment system to have the capability of operation under continuous vacuum conditions from the standpoint of controlling leakage from the containment and permitting a reduction in the size or the design pressure of the containment structure.

It is therefore a primary object of this invention to provide a new and improved containment system for nuclear power reactors.

Another object of this invention is to provide a new and improved containment system for nuclear power reactors which has improved safety characteristics and structural stability over previously known containment systems, and yet which is economically practical to construct.

Another object of this invention is to provide a new and improved containment system for nuclear power reactors which is particularly adaptable for operation under vacuum conditions.

Another object of this invention is to provide a new and improved containment system for nuclear power reactors having primary and secondary containments which are combined into an integrated structure and in which the greater expansion of the primary containment in the event of a vapor or steam-producing reactor accident does not affect the remaining structure.

Another object of this invention is to provide a new and improved pressure suppression containment system for nuclear power reactors which eliminates or significantly reduces the disadvantages of prior pressure suppression containment systems.

Another object of this invention is to provide a new and improved containment system for nuclear power reactors which utilizes the pressure suppression containment concept in a con-crete containment structure.

Another object of this invention is to provide, in a new and improved containment system for nuclear power reactors, a pressure suppression primary containment structure wherein the biological shielding, vapor barrier and strength member are constructed and function as a composite structure.

Another object of this invention is to provide, in a new and improved containment system for nuclear power reactors, a pressure suppression primary containment structure which functions both as a radiation shielding during normal reactor operation and as a pressure vessel in the event of a vapor or steam-producing reactor accident.

Another object of this invention is to provide, in a new and improved containment system for nuclear power reactors, a structure within the primary containment which carries the reactor vessel and an intermediate horizontal floor dividing the primary containment into a drywell and a pressure suppression chamber, and which internal structure is supported independently of the primary containment structure.

Another object of this invention is to provide a new and improved containment system for nuclear power reactors having primary and secondary containment structures of concrete, wherein the primary containment is capable of design pressures, temperature and containment free volume which accomplish the same result as those of conventional steel containment structures.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the present invention is directed to a new and improved containment system for nuclear power reactors. In accordance with the purposes and objects of the invention, the containment system includes a pressure suppression primary containment which is combined with a secondary containment into an integrated structure, and the strength member for both the primary and secondary containment is concrete.

As preferably embodied and broadly described, this containment system comprises, a generally conically shaped concrete primary containment vessel internally lined with a gas-impervious membrane and divided into an upper drywell chamber and a lower pressure suppression chamber, means for providing a seal between the drywell floor and the walls of the primary containment vessel, conduit means interconnecting the drywell chamber with a pressure suppression pool in the pressure suppression chamber, and a secondary containment comprising a cylindrical concrete vessel housing the primary containment vessel and also supported independently thereof.

It will be understood that the foregoing general description and the following detailed description as well are exemplary and explanatory of the invention but are not restrictive thereof.

The accompanying drawing, referred to herein and constituting a part hereof, illustrates one embodiment of the invention, and together with the description, serves to explain the principles of the invention.

BRIEF DESCRIPTION OF THE DRAWING

The accompanying drawing is an isometric view of a vertical section, partly fragmentary and partly schematic, of one-half of a pressure suppression containment system constructed in accordance with the invention.

DESCRIPTION OF THE PREFERRED EMBODIMENT

Referring now more particularly to the preferred embodiment of the invention shown in the accompanying drawing, there is illustrated a containment system, indicated generally by reference numeral 10, which includes a pressure suppression primary containment, indicated generally by reference numeral 11, and a secondary containment, indicated generally by reference numeral 12.

In accordance with the invention, the primary containment 11 comprises a concrete pressure vessel 13, preferably of reinforced concrete, in the shape of a frustum of a cone, founded on a concrete mat 14. The preferred height to base diameter of the conical vessel 13 is in the range of between about 1 to 3, and is particularly about 1.5. The inside surface of pressure vessel 13 is lined with a gas or vapor impervious membrane 15, preferably steel plating, which extends over the walls of the vessel and also over the top of the founding mat 14 to provide a continuous, or essentially continuous, liner for the primary containment vessel.

The gas or vapor impervious steel liner 15 is suitably anchored to the concrete pressure shell 13, as by studs (not shown), so that the liner and concrete shell will act together during the temperature change occurring in the event of the maximum credible vapor or steam-producing accident. Liner 15 is secured at its upper end, as by welding, to a flange 16 embedded and suitably anchored in the top of the reinforced concrete cone 13. A closure member 17 bolted to flange 16 completes the inner lining. Advantageously, lining closure 17 is housed within a cylindrical concrete neck portion 18 extending upwardly from the top of cone 13 and closed by top cover 19.

In accordance with the invention, support means is provided within the primary containment which carries the reactor vessel and an intermediate horizontal floor entirely independently of the primary containment vessel.

As here preferably embodied, this support means comprises a cylindrical center concrete structure 20 and a series of spaced concrete columns 21 arranged in a circular row thereabout, each of which extend upwardly from the founding mat 14. An internal floor 22 is attached to the cylindrical support 20 and extends horizontally radially outwardly therefrom into sealing engagement with the containment vessel walls. Floor 22 extends to, but is structurally detached from, the primary containment vessel walls, the floor deriving its necessary intermediate radial support from columns 21. Thus, relative movement is permitted between the internal floor and the primary containment.

The reactor vessel 25 and its shield 26 are suitably supported on the upper end of cylindrical support 20, above the horizontal floor 22. In addition, lateral support means is provided for supporting the reactor vessel against earthquake and jet forces from piping breaks. As embodied, this means comprises horizontal beam members 27 and horizontal strut members 28 extending from each of the reactor vessel 25, reactor vessel shield 26, and cylindrical support 20 to the containment walls, the latter carrying all lateral forces to the foundation.

It will be apparent from the foregoing that the internal horizontal floor 22 serves to divide the primary containment 11 into upper and lower chambers 30, 31, respectively. As here preferably embodied, upper chamber 30 houses the reactor vessel, illustrated at 25, as well as the essential equipment of the nuclear steam supply system, such as the reactor coolant recirculating loops and other branch connections of the reactor primary system (not shown), and is termed the "drywell." The lower chamber 31 constitutes a pressure suppression room in which is stored a large volume of suitable condensing liquid 32, such as water, to thereby form a pressure suppression pool.

A venting system in the form of a series of conduits 33 extending downwardly through floor 22 and terminating within pressure suppression pool 32 connects the drywell 30 with the pressure suppression chamber 31.

In accordance with the invention, a secondary or external containment is provided to house the primary containment vessel as an integral structure thereof. As preferably embodied, the secondary containment comprises a cylindrical concrete vessel 40, preferably of reinforced concrete, commonly founded on concrete mat 14 with the primary containment vessel 13.

Advantageously, and as here preferably embodied, the secondary containment vessel walls are extended sufficiently above the primary containment vessel to provide means for supporting rails for a polar crane, indicated generally by reference numeral 45. A top roof closure 46 completes the secondary containment. Also advantageously, as shown in the accompanying drawing, the primary containment vessel 13 need not be concentric with the secondary containment vessel 40, thereby providing maximum room for auxiliary equipment in the reactor building.

While the primary and secondary containment vessels 13, 40, respectively, are commonly founded on concrete mat 14, it is important, in order to combine these structures into an integral unit, that they be supported independently of one another. Thus, for example, the cylindrical neck 18, having the refueling and service floors 50, 51, respectively, partially supported therefrom, is separated from the top of cone 13, as illustrated at 41. Also, each of the remaining floors 52, 53, 54 extending between the two containment vessels are solidly attached to the secondary containment and supported so as to permit free expansion of the primary containment structure. A particularly advantageous result of the foregoing integrated containment structure is that it permits the spent fuel storage pool 48 to be safely located within the containment building, conveniently at the refueling floor level 50 adjacent the reactor top closures 17, 19, thereby completely eliminating the need for a separate spent fuel building.

While not shown in the accompanying drawing for ease of illustration and because they do not form a part of this invention, it will be understood to those of ordinary skill in the art that the several remaining compartments built into the containment structure between the primary and secondary structures may conveniently house the service and auxiliary equipment for the nuclear system in any suitable arrangement.

It will be apparent from the foregoing that the operation of the containment system of the invention is as follows. In the event of a reactor coolant barrier failure within the drywell 30, reactor water and steam are released into the drywell air space. The resulting increased drywell pressure forces a mixture of gas, steam, and water through the conduits 33 into the pool of condensing liquid 32 stored in the suppression chamber 31. The steam condenses in the suppression pool, resulting in a rapid pressure reduction in the drywell.

It will be understood that, by providing a sufficient number of conduits 33, sufficient volume of condensing liquid 32, and sufficient free volume above the suppression pool, the containment system may be designed for the maximum design pressures and temperatures associated with the utilization of the pressure suppression mode of containment.

While the containment system of the invention thus provides a pressure suppressing scheme capable of instantaneous action upon the occurrence of a vapor or steam-producing reactor accident without reliance upon any external services or operator control, it will be understood that it is within the scope of the invention to provide such auxiliary equipment with the system for further reducing the temperature and pressure within the primary containment, both during normal operation and upon a vapor or steam-producing accident, as is well known to those skilled in the art. Thus, e.g., all the non-condensible fluids and vapors previously within the drywell are assumed to be transferred to the suppression chamber gas space, thereby resulting in a build-up of pressure within the suppression chamber. Hence, there may be advantageously provided an emergency cooling system as, e.g., in the form of a cold water spray, for removing heat from the reactor core, the drywell, and from the pressure suppression pool during accident conditions. In addition, there may be provided internal cooling coils and recirculating fans for continuous cooling of the containment atmosphere. Also advantageously, suitable isolation valves may be provided in the process system piping which may be actuated in the event of a vapor or steam-producing accident to insure retention of radioactive materials which might be released from the reactor within the primary containment.

It will be seen from the foregoing description that the preferred embodiment illustrated in the accompanying drawing achieves the enumerated purposes and objects of the invention and it is expected that other objects and advantages will be learned from practice of the invention. Thus, the conical shape of the pressure vessel 13 for the primary containment is highly desirable for construction with concrete, provides for a highly efficient overall plant arrangement, and takes advantage of the known inherent structural stability of a simple cone. By constructing the primary containment pressure vessel so as to utilize concrete as the strength member, lined with a gas or vapor-impervious membrane, the vessel is not subject to catastrophic failure by propagation of membrane cracking and therefore has increased safety characteristics over previously known steel pressure vessels. Also, the capability of concrete to withstand vacuum conditions exceeds that of similar steel structures, and the containment system of the invention is therefore particularly adaptable for operation under vacuum conditions. The provision of a concrete conical shaped primary containment vessel achieves the further object of serving both as a radiation shielding during normal operation as well as a pressure vessel in the event of a steam or vapor producing reactor accident. The primary containment of the invention is capable of being designed for the maximum pressures and temperatures which are effected by utilization of the pressure suppression containment concept. By supporting the reactor vessel, internal drywell floor and secondary containment independently of one another, a containment system is achieved wherein both the primary and secondary containment may be incorporated into an integrated structure.

It will be understood to those of ordinary skill in the art that known equivalent materials may be used in place of or in addition to those mentioned herein as presently being preferred. Thus, for example, pressure vessel 13 may alternatively be formed of prestressed concrete or a combination of reinforced and prestressed concrete; the gas or vapor impervious membrane 15 may alternatively be formed of a metal other than steel, or a plastic material, where such alternative materials are capable of achieving leaktightness to a degree similar to that of steel. Modifications in the preferred structure will also occur to those skilled in the art. Thus, for example, the founding mat 14 may be curved, rather than flat. Also, while the thickness of the membrane material may normally be determined only on the basis of leaktightness considerations, it may be advantageous for the leaktight liner to serve as the inside concrete form during the construction of the primary containment concrete walls and, in that event, it will be understood that the liner must be of sufficient strength to initially support the concrete. Finally, it may be advantageous to include the entire cylindrical space defined by the structure 20 as part of the drywell in order to provide additional space for auxiliary equipment and, consequently, decrease the amount of containment volume required for this purpose.

The invention in its broader aspects is not limited to the specific embodiment herein shown and described but departures may be made therefrom within the scope of the accompanying claims, without departing from the principles of the invention and without sacrificing its chief advantages.

What is claimed is:

1. In a containment system for nuclear reactors and the like,
   a primary containment structure capable of containing a reactor vessel and related primary system components therein,
   said primary containment structure including a strength member which comprises a generally conically shaped vessel constructed of concrete;
   support means within said primary containment structure for supporting said reactor vessel and related components,
   said support means, in turn, being supported independently of the primary containment concrete vessel;
   said support means further supporting an internal horizontal floor member independently of said primary containment concrete vessel,
   said internal horizontal floor member dividing said primary containment concrete vessel into an upper drywell chamber and a lower pressure suppression chamber, said upper drywell chamber containing said reactor vessel and related primary system components and said lower pressure suppression chamber including a pool of condensing liquid;
   means providing a seal between said internal horizontal floor member and said primary containment concrete vessel; and
   conduit means communicating said drywell chamber and the pressure suppression pool in said pressure suppression chamber,
   whereby in the event of a vapor or steam-producing reactor accident, escaping fluids are discharged from said drywell chamber into said pressure suppression pool.

2. A combination as defined in claim 1, including a gas-impervious membrane essentially continuously lining the inside surface of the primary containment concrete vessel.

3. A combination as defined in claim 1, wherein the conically shaped primary containment concrete vessel has a height to base diameter ratio in the range of between about 1 to 3.

4. A combination as defined in claim 1 wherein the conically shaped primary containment concrete vessel is constructed of reinforced concrete.

5. A combination as defined in claim 1 wherein the conically shaped primary containment concrete vessel is constructed of prestressed concrete.

6. A combination as defined in claim 1, and further including a secondary containment vessel housing said primary containment vessel and means supporting said secondary containment vessel independently of said primary containment vessel.

7. A combination as defined in claim 2, wherein said gas-impervious membrane is steel.

8. A combination as defined in claim 3, wherein said height to base diameter ratio is about 1.5.

* * * * *